United States Patent
Ebiko

(10) Patent No.: US 8,714,218 B2
(45) Date of Patent: May 6, 2014

(54) PNEUMATIC TIRE WITH TREAD HAVING RIB PORTION, SUB-GROOVES AND SIPES

(75) Inventor: Masahiro Ebiko, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 805 days.

(21) Appl. No.: 12/922,494

(22) PCT Filed: Feb. 19, 2009

(86) PCT No.: PCT/JP2009/052854
§ 371 (c)(1),
(2), (4) Date: Sep. 14, 2010

(87) PCT Pub. No.: WO2009/130936
PCT Pub. Date: Oct. 29, 2009

(65) Prior Publication Data
US 2011/0005653 A1    Jan. 13, 2011

(30) Foreign Application Priority Data

Apr. 22, 2008   (JP) .................. 2008-111880

(51) Int. Cl.
*B60C 11/03* (2006.01)
*B60C 11/12* (2006.01)

(52) U.S. Cl.
USPC ................. 152/209.18; 152/209.27; 152/903; 152/DIG. 3

(58) Field of Classification Search
USPC ................... 152/209.18, 209.27, 903, DIG. 3
See application file for complete search history.

(56) References Cited

U.S. PATENT DOCUMENTS

| 4,078,596 A | 3/1978 | Nakayama et al. |
| 6,123,130 A * | 9/2000 | Himuro et al. ........... 152/DIG. 3 |

(Continued)

FOREIGN PATENT DOCUMENTS

| JP | 52-044901 A | 4/1977 |
| JP | 02-179508 A * | 7/1990 |

(Continued)

OTHER PUBLICATIONS

Machine translation for Japan 2006-224770 (no date).*

(Continued)

*Primary Examiner* — Steven D Maki
(74) *Attorney, Agent, or Firm* — Carrier Blackman & Associates, P.C.; Joseph P. Carrier; Anne G. Sabourin

(57) ABSTRACT

A pneumatic tire is configured such that: paired first main grooves extending in a tire circumferential direction are provided on the two sides of a tire equator line in a tread portion, respectively; a distance between a center position of each first main groove and the tire equator line is set at 8% to 20% of a ground contact width W; a first land portion is defined between these first main grooves; multiple sub-grooves each having a curved shape are formed in each of both edge portions of the first land portion at intervals in the tire circumferential direction; one end of each sub-groove is opened to the corresponding first main groove, and the other end of the sub-groove is terminated inside the first land portion; a rib portion continuously extending in the tire circumferential direction is formed in an area of the first land portion on the tire equator line; and a relation between a length (L) of a center line of each sub-groove and a pitch length (P) of the sub-grooves in the tire circumferential direction satisfies $1.1 \times P \leq L \leq 2.0 \times P$.

6 Claims, 1 Drawing Sheet

(56) References Cited

U.S. PATENT DOCUMENTS

| | | | |
|---|---|---|---|
| 6,196,288 B1 * | 3/2001 | Radulescu et al. | 152/DIG. 3 |
| 6,514,366 B1 * | 2/2003 | Xie | 156/110.1 |
| 6,923,232 B1 * | 8/2005 | Welbes et al. | 152/209.18 |
| 2007/0163692 A1 | 7/2007 | Miyasaka et al. | |
| 2010/0206445 A1 | 8/2010 | Dobashi et al. | |

FOREIGN PATENT DOCUMENTS

| | | | |
|---|---|---|---|
| JP | 06-183214 A * | 7/1994 | |
| JP | 6-191226 A | 7/1994 | |
| JP | 9-216504 A | 8/1997 | |
| JP | 2002-316515 A | 10/2002 | |
| JP | 2003-146020 A | 5/2003 | |
| JP | 2006-160055 A | 6/2006 | |
| JP | 2006-224770 A * | 8/2006 | |
| JP | 2007-302112 A | 11/2007 | |
| WO | 2005-063507 A1 | 7/2005 | |
| WO | 2008-143034 A1 | 11/2008 | |

OTHER PUBLICATIONS

Translation for Japan 02-179508 (no date).*
Machine translation for Japan 06-183214 (no date).*

* cited by examiner

PNEUMATIC TIRE WITH TREAD HAVING RIB PORTION, SUB-GROOVES AND SIPES

TECHNICAL FIELD

The present invention relates to an all-season or mud & snow pneumatic tire, and more specifically to a pneumatic tire: which is improved in the driving stability on a wet road surface; and which is capable of ensuring a better snow performance.

BACKGROUND ART

For improving the driving stability of a pneumatic tire on a wet road surface, enhancement of the edge effect is effective, and the ensuring of the block rigidity is also important at the same time. Meanwhile, one of the significant factors for ensuring the snow traction is increase in a volume of grooves. For instance, in a case where the volume of grooves in the tread portion of the pneumatic tire is increased, the snow traction can be improved, whereas the block rigidity is decreased, so that the driving stability on a wet road surface is deteriorated. As described above, the conditions for improving the driving stability on a wet road surface and the snow performance are in a trade-off relationship.

Against this background, numerous proposals have been heretofore made on tread patterns each exhibiting a good snow performance (see Patent Document 1 and Patent Document 2, for instance). However, it is still difficult to achieve both the driving stability on a wet road surface and the snow performance by using these tread patterns.

Patent Document 1: Japanese patent application Kokai publication No. Hei 9-216504
Patent Document 2: Japanese patent application Kokai publication No. 2003-146020

DISCLOSURE OF THE INVENTION

Problems to be Solved by the Invention

An object of the present invention is to provide a pneumatic tire which is improved in the driving stability on a wet road surface and which is capable of ensuring a better snow performance.

Means for Solving the Problems

A pneumatic tire according to present invention to achieve the aforementioned object is characterized in that paired first main grooves extending in a tire circumferential direction are provided on both sides of a tire equator line in a tread portion, respectively, a distance between a center position of each first main groove and the tire equator line is set at 8% to 20% of a ground contact width W, a first land portion is defined between these first main grooves, a plurality of sub-grooves each having a curved shape are formed in each of both edge portions of the first land portion at intervals in the tire circumferential direction, one end of each sub-groove is opened to the corresponding first main groove, and the other end of the sub-groove is terminated inside the first land portion, a rib portion continuously extending in the tire circumferential direction is formed in an area of the first land portion on the tire equator line, and a relation between a length L of a center line of each sub-groove and a pitch length P of the sub-grooves in the tire circumferential direction is set to satisfy $1.1 \times P \leq L \leq 2.0 \times P$.

Effects of the Invention

The present invention ensures the rigidity of the first land portion situated on the tire equator line, and concurrently secures the drainage based on the first main grooves, by specifying the locations of the respective first main grooves. In addition, the present invention avoids decrease in the rigidity of the first land portion by: forming the multiple sub-grooves, each of which has the curved shape, in each of the two edge portions of the first land portion; opening one end of each sub-groove to the corresponding first main groove, and terminating the other end of the sub-groove in the first land portion; and forming the rib portion, which continuously extends in the tire circumferential direction, in the area of the first land portion on the tire equator line. Moreover, the present invention avoids decrease in the rigidity of the first land portion, and sufficiently ensures the groove components in the center area at the same time, by setting the length L of the center line of each sub-groove relatively to the pitch length P of the sub-grooves in the tire circumferential direction in the predetermined range. These improve the pneumatic tire in the driving stability on a wet road surface, and make it possible to ensure a better snow performance (including the snow traction performance and the snow braking performance).

In the present invention, it is desirable that the sipes should be provided between each sub-groove in the first land portion and the corresponding first main groove. To put it more specifically, it is desirable that the multiple sipes each extending in a width direction of the tire should be provided between each sub-groove in the first land portion and the corresponding first main groove. The installation of the sipes in the above-mentioned location makes it possible to further improve the driving stability on a wet road surface and the snow performance.

It is desirable that: the second main grooves each extending in the tire circumferential direction should be provided outward of the respective first main grooves; the second land portions are defined between the first main grooves and the second main grooves, respectively; the width of each second land portion should be set at 10% to 30% of the ground contact width W; and each second land portion should be formed of the multiple blocks defined by the multiple lug grooves each extending in the tire width direction. Because the second land portions, each having the predetermined width and each formed of the multiple blocks, are arranged between the first main grooves and the corresponding second main grooves, the rigidity of the blocks can be optimized. This makes it possible to further improve the driving stability on a wet road surface and the snow performance.

It is desirable that the third land portions should be arranged outward of the respective second main grooves; and each third land portion should have the rib structure which continuously extends in the tire circumferential direction. Thereby, the noise performance can be maintained favorably, even though the driving stability on a wet road surface and the snow performance are further improved by forming each second land portion by including the multiple blocks in the second land portion.

It is desirable that the fine grooves each extending in the tire circumferential direction should be provided outward of the respective third land portions; and the see-through portion which makes the groove space continuously extend in the tire circumferential direction should be formed in each fine groove at the predetermined location in the tire width direction. The arrangement of the see-through portions outward of the respective third land portions makes it possible to yet further improve the driving stability on a wet road surface and the snow performance.

It is desirable that: the shoulder land portions should be arranged outward of the respective fine grooves; the multiple lug grooves each extending in the tire width direction should be formed in each shoulder land portion at intervals in the tire circumferential direction, the lug grooves each communicating with the corresponding fine groove and the corresponding ground contact end; and the angle of inclination of each lug groove to the tire circumferential direction at the corresponding ground contact end should be set at 85° to 95°. Thereby, the snow performance can be enhanced.

In the present invention, the ground contact width is defined as a maximum dimension of a ground contact area of the tire in an axial direction of the tire, which is formed when: the tire is placed on a flat surface in a way that the tread portion is in contact with the ground with the tire's internal pressure of 200 kPa; and the tire thus placed is subjected to load equal to 85% of the load capacity required at an internal pressure of 200 kPa, which is specified for each tire in accordance with the standards (for instance, JATMA, TRA, ETRTO or China's GB standards) on which the tire is based.

Furthermore, the main grooves mean grooves each having a groove width of 6.0 mm to 18.0 mm, and having a groove depth of 6.0 mm to 16.0 mm. The fine grooves mean grooves each having a groove width of 2.0 mm to 4.0 mm, and having a groove depth of 2.0 mm to 12.0 mm. No specific restrictions are imposed on the groove width of the sub-grooves, the groove width of the lug grooves, the groove depth of the sub-grooves, or the groove depth of the lug grooves. Nevertheless, it is desirable that smaller groove widths and groove depths than those of the main grooves should be employed for the sub-grooves and the lug grooves.

Figure 1:
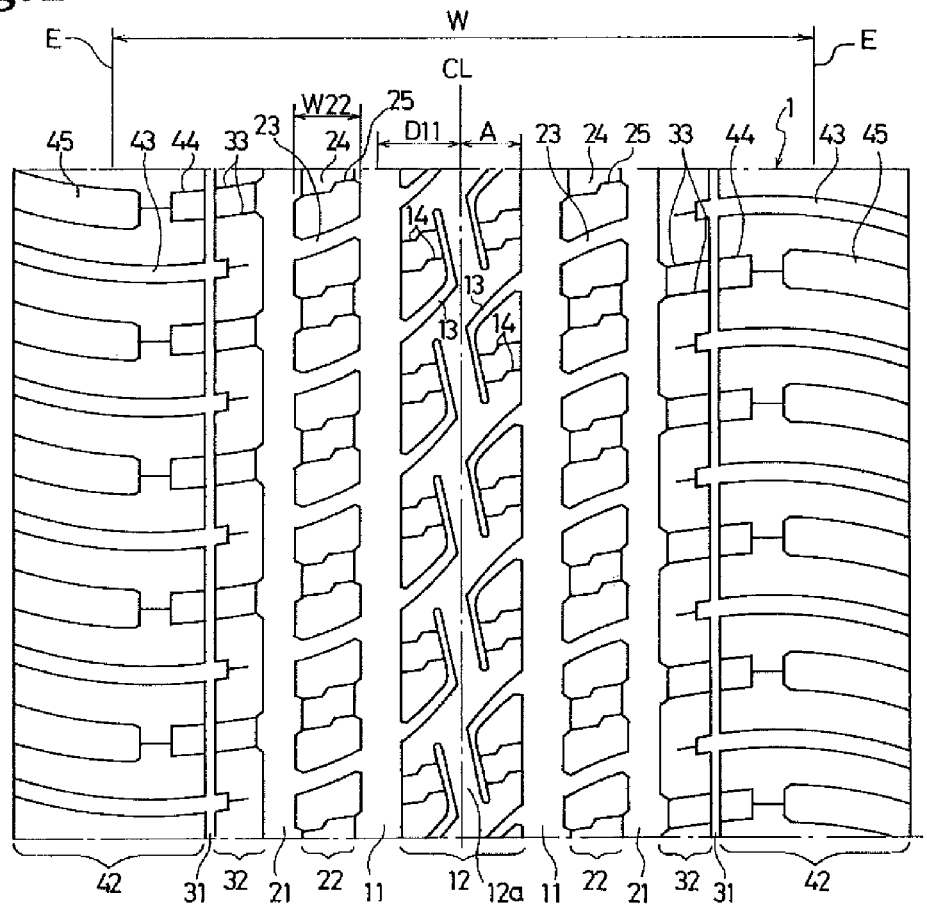
FIG. 1 is a development view showing a tread pattern of a pneumatic tire according to an embodiment of the present invention.

| EXPLANATION OF REFERENCE NUMERALS | |
|---|---|
| 1 | tread portion |
| 11 | main groove (first main groove) |
| 12 | land portion (first land portion) |
| 13 | sub-groove |
| 14 | sipe |
| 21 | main groove (second main groove) |
| 22 | land portion (second land portion) |
| 23 | lug groove |
| 24 | block |
| 25 | sipe |
| 31 | fine groove |
| 32 | land portion (third main groove) |
| 33 | sipe |
| 42 | shoulder land portion |
| 43 | lug groove |
| 44 | sipe |
| 45 | decoration groove |

BEST MODE FOR CARRYING OUT THE INVENTION

Figure 2:
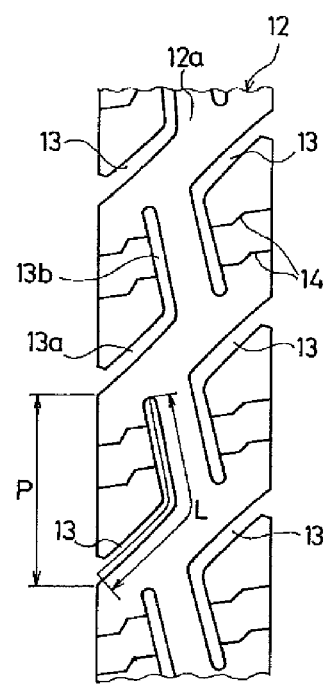
FIG. 2 is a magnified view showing a main section of the tread pattern shown in FIG. 1.

Hereinafter, detailed descriptions will be provided for a configuration of the present invention with reference being made to the attached drawings. FIG. 1 is a development view showing a tread pattern of a pneumatic tire according to the present invention. FIG. 2 is a magnified view showing a main section of the tread pattern shown in FIG. 1.

As shown in FIG. 1, paired main grooves 11, 11 (first main grooves) extending in a circumferential direction of the tire are formed on the two sides of a tire equator line CL in a tread portion 1. A distance D11 between a center position of each main groove 11 and the tire equator line CL is set at 8% to 20% of a ground contact width W. A land portion 12 (first land portion) is defined between these main grooves 11, 11.

Multiple sub-grooves 13 each having a curved shape are formed at intervals in each of the two edge portions of the land portion 12. Each sub-groove 13 has a structure in which: one end of the sub-groove 13 is opened to the corresponding main groove 11; and the other end of the sub-groove 13 is terminated inside the land portion 12. To put it specifically, in one edge portion (corresponding to the left half of the drawing) of the land portion 12, each of the corresponding sub-grooves 13 is curved in one of the circumferential directions of the tire (in the upward direction in the drawing) at its middle. In addition, in the other edge portion (corresponding to the right half of the drawing) of the land portion 12, each of the corresponding sub-grooves 13 is curved in the other of the circumferential directions of the tire (in the downward direction in the drawing) at its middle. Each of these sub-grooves 13 includes: a base end portion 13a situated closer to an opening end; and a front end portion 13b situated closer to a closing end (see FIG. 2). The direction of inclination of the base end portion 13a relative to the tire circumferential direction is opposite to the direction of inclination of the front end portion 13b relative to the tire circumferential direction. The inclination angle of the base end portion 13a to the tire circumferential direction is set in a range of 45° to 90°, and the inclination angle of the front end portion 13b to the tire circumferential direction is set in a range of 20° to 70°.

While the sub-grooves 13 are arranged in each of the two edge portions of the land portion 12, a rib portion 12a continuously extending in the tire circumferential direction is formed in an area on the tire equator line CL. In addition, as shown in FIG. 2, the length L of the center line of each sub-groove 13 is set in a way that a relation of a length L of a center line of each sub-groove 13 to a pitch length P of the sub-grooves 13 in the tire circumferential direction satisfies $1.1 \times P \leq L \leq 2.0 \times P$.

The pneumatic tire according to the present invention can be improved in the driving stability on a wet road surface, and can concurrently ensure a better snow performance, because, as described above, the land portion 12 defined by the paired main grooves 11 is provided in the tread portion 1 and the multiple sub-grooves 13 are provided to the land portion 12. In particular, the specification of the locations of the respective main grooves 11 makes it possible to secure the rigidity of the land portion 12 situated on the tire equator line CL and the drainage based on the main grooves 11. In this respect, if the distance D11 between the center position of each main groove 11 and the tire equator line CL is shorter than 8% of the ground contact width W, the rigidity of the land portion 12 is insufficient, and the driving stability on a wet road surface is deteriorated. On the contrary, if the distance D11 is longer than 20% of the ground contact width W, the land portion 12 is too wide, and the drainage in the center area is deteriorated.

Further, decrease in the rigidity of the land portion 12 situated on the tire equator line CL can be avoided because: the multiple sub-grooves 13 each having a curved shape are formed in each of the two edge portions of the land portion 12; one end of each sub-groove 13 is opened to the corresponding main groove 11, and the other end of the sub-groove 13 is terminated in the land portion 12; and the rib portion 12a continuously extending in the tire circumferential direction is formed in the area of the land portion 12 on the tire equator line CL.

Moreover, the pneumatic tire according to the present invention can avoid decrease in the rigidity of the land portion 12, and can concurrently ensure the groove components in the center area sufficiently, because the length L of the center line of each sub-groove 13 is specified to be in the foregoing range relatively to the pitch length P of the sub-grooves 13 in the tire circumferential direction. In this respect, if the length L of the center line of the sub-groove 13 is shorter than 1.1×P, the groove components in the center area is insufficient, and the snow performance is accordingly insufficient. On the contrary, if the length L is longer than 2.0×P, the rigidity of the land portion 12 is decreased, and the driving stability is accordingly deteriorated. It should be noted that it is desirable that a relation represented by $L \geq \sqrt{(P^2+A^2)}$ should be satisfied, where A denotes a distance between the tire equator line LC and an outer end of the land portion 12 in a width direction of the tire. In other words, it is desirable that the length L of the center line of each sub-groove 13 should be longer than the length of a diagonal line of a rectangle with the length P and the width A. It is particularly desirable that the relation represented by $1.1 \times \sqrt{(P^2+A^2)} \leq L \leq 1.5 \times \sqrt{(P^2+A^2)}$ should be satisfied.

In the above-described tread portion 1, multiple sipes 14 each extending in the tire width direction are formed between each sub-groove 13 and the corresponding main groove 11. The forming of the sipes 14 between each sub-groove 13 and the corresponding main groove 11 enhances an edge effect. This makes it possible to enhance the driving stability on a wet road surface and the snow performance. In order to achieve both the rigidity and the edge effect, it is desirable that each sipe 14 should take on a shape having one to four curve points or inflection points in a plan view, not a linear shape or an arc shape with a single curvature.

In the above-described tread portion 1, paired main grooves 21, 21 (second main grooves) each extending in the tire circumferential direction are formed outward of the main grooves 11, respectively. Land portions 22 (second land portions) are defined between the main grooves 11 and the main grooves 21, respectively. A width W22 of each land portion 22 is set at 10% to 30% of the ground contact width W. Each land portion 22 includes multiple blocks 24 which are defined by multiple lug grooves 23 each extending in the tire width direction. The arranging of the land portions 22 each including multiple blocks 24 between the main grooves 11 and the main grooves 21 in this manner further enhances the driving stability on a wet road surface and the snow performance. Note that, in order to improve these performances, it is desirable that: a pitch length of the lug grooves 23 in the tire circumferential direction should be equal to the pitch length P of the sub-grooves 13 in the tire circumferential direction; and the lug grooves 23 should be arranged on extensions of the sub-grooves 13, respectively. It is desirable that each of the blocks 24 constituting each land portion 22 should be provided with sipes 25 each extending in the tire width direction as in the case of the land portion 12.

Moreover, in the foregoing tread portion 1, paired fine grooves 31, 31 each extending in the tire width direction are formed outward of the main grooves 21, respectively. Land portions 32 (third land portion) are defined between the main grooves 21 and the fine grooves 31, respectively. Each land portion 32 has a rib structure, continuously extending in the tire circumferential direction. The forming of the land portions 32 each having such a rib structure enables a noise performance to be maintained favorably, even when the driving stability on a wet road surface and the snow performance are further improved by including the multiple blocks 24 in each land portion 22. Note that, in order to achieve both the noise performance with the driving stability on a wet road surface, it is desirable that each land portion 32 should be provided with two or more sipes 33 per pitch. When a groove width of each sipe 33 is equal to or narrower than 1.8 mm, the forming of the sipes 33 does not hinder the noise performance.

The fine grooves 31 have see-through portions which make groove spaces continuously extend in the tire circumferential direction at predetermined locations in the tire width direction, respectively. This arrangement of the fine grooves 31 with the see-through portions outward of the land portions 32 secures the drainage and the edge effect for the pneumatic tire. For this reason, it is possible to enhance the driving stability on a wet road surface and the snow performance.

Moreover, shoulder land portions 42 are arranged outward of the respective fine grooves 31 in the foregoing tread portion 1. Multiple lug grooves 43 are formed in each shoulder land portion 42 at intervals in the tire circumferential direction. Each lug groove 43 extends in the tire width direction, and thus communicates with the corresponding fine groove 31 and a corresponding ground contact end E. The angle of inclination of each lug groove 43 to the tire circumferential direction at the corresponding ground contact end E is set at 85° to 95°. This installation of the lug grooves 43, which are oriented in the radial direction, in each shoulder land portion 42 can enhance the snow performance. It is desirable that a groove width of each lug groove 43 at the ground contact end E should be equal to 10% to 15% of a pitch length of the lug grooves 43 in the tire circumferential direction. This makes it possible to achieve both the driving stability on a wet road surface and the snow stability at a higher level. Note that sipes 44 each extending in the tire width direction with two branched ends and decoration grooves 45 are formed between each two neighboring lug grooves 43 in each shoulder land portion 42.

The configuration of the pneumatic tire according to the foregoing embodiment has the tread pattern which is point-symmetrical with respect to an arbitrary point on the tire equator line CL (namely, the non-directional tread pattern). However, the configuration of the pneumatic tire according to the present invention may have a tread pattern which is line-symmetrical with respect to the tire equator line CL as an axis of symmetry. Alternatively, the configuration of the pneumatic tire according to the foregoing embodiment may have a tread pattern whose locations of the grooves on the respective two sides of the tire equator line CL are shifted from each other in the tire circumferential direction.

The foregoing detailed descriptions have been provided for the preferable embodiment of the present invention. However, it should be understood that various modifications, substitutions and replacements may be applied to the embodiment without departing from a scope or spirits of the present invention which are defined by the attached scope of claims.

EXAMPLES

Pneumatic tires according to each of Examples 1 to 5 were made with a tire size of P265/70R17 113H (TRA), and with the tread pattern shown in FIG. 1, but by setting a ratio of the distance between the center position of each first main groove and the tire equator line to the ground contact width W (hereinafter referred to as a "location of first main groove") as well as a ratio (L/P) of the length L of the center line of each sub-groove to the pitch length P of the sub-grooves in the tire circumferential direction as shown in Table 1.

Tires according to each of Comparative Examples 1 to 3 were prepared for the comparison purpose. The tires according to Comparative Example 1 had no sub-grooves. The tires according to Comparative Example 2 had sub-grooves, the two ends of each of which were opened to the two main grooves situated at the two sides of the first land portion, respectively. The tires according to Comparative Example 3 had the ratio (L/P) of the length L of the center line of each sub-groove to the pitch length P of the sub-grooves which was set at 0.8.

For a set of tires according to each of Comparative Examples 1 to 3 and Examples 1 to 5, the snow braking performance and the driving stability were evaluated in accordance with the below-described evaluation method. Evaluation results were shown in Table 1 as well.

Snow Braking Performance:

For each of Comparative Examples 1 to 3 and Examples 1 to 5, the corresponding test tires mounted on wheels each with a 17×8.0 J rim size were attached to a SUV vehicle having a displacement of 6000 cc with an air pressure of 210 kPa, and a braking distance which the SUV vehicle traveled from the moment the brakes were applied during traveling at a speed of 40 km/h on the snow until the SUV vehicle came to a full stop were measured. For the set of tires according to each of Comparative Examples 1 to 3 and Examples 1 to 5, the braking distance was measured 5 times, and an average of three measurement values exclusive of the maximum and minimum measurement values was found. Evaluation results were shown by indexes obtained by using inverse numbers of measurement values and by setting the result of Comparative Example 3 at 100. A larger index number means a better snow braking performance.

Driving Stability:

For each of Comparative Examples 1 to 3 and Examples 1 to 5, the corresponding test tires mounted on wheels each with a 17×8.0 J rim size were attached to a SUV vehicle having a displacement of 6000 cc with an air pressure of 210 kPa, and the driving stability on a wet road surface was evaluated as a feeling experienced through a travelling at a speed range of 40 km/h to 100 km/h. Evaluation results were shown by indexes based on the result of Comparative Example 3 set at 100. A larger index number means a better driving stability on a wet road surface.

TABLE 1

|  | Comp. Ex. 1 | Comp. Ex.2 | Comp. Ex. 3 | Ex. 1 | Ex. 2 | Ex. 3 | Ex. 4 | Ex. 5 |
| --- | --- | --- | --- | --- | --- | --- | --- | --- |
| Location of first main groove (%) | 15 | 15 | 15 | 15 | 15 | 15 | 10 | 20 |
| Presence or absence of sub-grooves | Absent | Present | Present | Present | Present | Present | Present | Present |
| Structure of sub-grooves | — | Opened at two ends | Opened at one end and closed at other end | Opened at one end and closed at other end | Opened at one end and closed at other end | Opened at one end and closed at other end | Opened at one end and closed at other end | Opened at one end and closed at other end |
| Ratio of length of sub-groove (L/P) | — | 2.2 | 0.8 | 1.5 | 1.1 | 2.0 | 1.5 | 1.5 |
| Driving stability (index) | 95 | 90 | 100 | 110 | 105 | 100 | 105 | 115 |
| Snow braking performance (index) | 90 | 110 | 100 | 110 | 105 | 115 | 115 | 105 |

As apparent from Table 1, the evaluation result of the tires according to each of Examples 1 to 5 was satisfactory in terms of the driving stability on a wet road surface and the snow braking performance. On the contrary, the evaluation result of the tires according to each of Comparative Examples 1 to 3 was not necessarily satisfactory in terms of the driving stability on a wet road surface and the snow braking performance.

What is claimed is:

1. A pneumatic tire characterized in that
paired first main grooves extending in a tire circumferential direction are provided on both sides of a tire equator line in a tread portion, respectively,
a distance between a center position of each first main groove and the tire equator line is set at 8% to 20% of a ground contact width W,
a first land portion is defined between these first main grooves,
a plurality of sub-grooves each having a curved shape are formed in each of both edge portions of the first land portion at intervals in the tire circumferential direction,
one end of each sub-groove is opened to the corresponding first main groove, and the other end of the sub-groove is terminated inside the first land portion,
wherein a plurality of sipes extending in a tire width direction, each sipe being connected to both of the corresponding sub-groove and the first main groove, are provided between each sub-groove in the first land portion and the first main groove, a rib portion continuously extending in the tire circumferential direction is formed in an area of the first land portion on the tire equator line, and a relation between a length L of a center line of each sub-groove and a pitch length P of the sub-grooves in the tire circumferential direction is set to satisfy $1.1 \times P \leq L \leq 2.0 \times P$.

2. The pneumatic tire according to claim 1, further comprising second main grooves extending in the tire circumferential direction that are outward of the respective first main grooves, wherein second land portions are defined between the first main grooves and the second main grooves, respectively, a width of each second land portion is set at 10% to 30% of the ground contact width W, and each second land portion is formed of a plurality of blocks defined by a plurality of lug grooves extending in the tire width direction.

3. The pneumatic tire according to claim 2, further comprising third land portions which are arranged outward of the respective second main grooves, wherein each third land portion has a rib structure in which the third land portion continuously extends in the tire circumferential direction.

4. The pneumatic tire according to claim 3, further comprising fine grooves extending in the tire circumferential direction that are outward of the respective third land portions, and a see-through portion where a groove space continuously extends in the tire circumferential direction at a predetermined location in the tire width direction is formed in each fine groove, wherein said fine grooves have a groove width of 2.0 mm to 4.0 mm.

5. The pneumatic tire according to claim 4, further comprising shoulder land portions which are arranged outward of the respective fine grooves, and a plurality of lug grooves which are formed in each shoulder land portion at intervals in the tire circumferential direction, the lug grooves each extending in the tire width direction and communicating with the corresponding fine groove and a corresponding ground contact end, and an angle of inclination of each lug groove to the tire circumferential direction at the corresponding ground contact end is set at 85° to 95°.

6. A pneumatic tire according to claim 1, wherein the relation between length L of a center line of each sub-groove and pitch length P of the sub-grooves in the tire circumferential direction is defined by the equation $1.1 \times \sqrt{(P^2+A^2)} \leq L \leq 1.5 \times \sqrt{(P^2+A^2)}$.

* * * * *